(12) United States Patent
van der Bos

(10) Patent No.: US 7,997,874 B2
(45) Date of Patent: Aug. 16, 2011

(54) WIND TURBINE ROTOR BLADE JOINT

(75) Inventor: Roelant van der Bos, Ibbenbueren (DE)

(73) Assignee: General Electric Company, Schenecdady, NY (US)

( * ) Notice: Subject to any disclaimer, the term of this patent is extended or adjusted under 35 U.S.C. 154(b) by 0 days.

(21) Appl. No.: 12/859,585

(22) Filed: Aug. 19, 2010

(65) Prior Publication Data

US 2011/0142675 A1  Jun. 16, 2011

(51) Int. Cl.
*F03D 1/06* (2006.01)
(52) U.S. Cl. .................................. 416/223 R; 416/225
(58) Field of Classification Search ............. 416/132 B, 416/132 R, 212 R, 212 A, 213 R, 213 A, 416/225, 224
See application file for complete search history.

(56) References Cited

U.S. PATENT DOCUMENTS

| | | | |
|---|---|---|---|
| 3,275,295 A * | 9/1966 | Caldwell et al. | 416/224 |
| 5,269,652 A * | 12/1993 | Petersen | 416/14 |
| 7,740,453 B2 | 6/2010 | Zirin et al. | |
| 2008/0069699 A1 | 3/2008 | Bech | |
| 2010/0143148 A1 | 6/2010 | Chen et al. | |

FOREIGN PATENT DOCUMENTS

| | | | |
|---|---|---|---|
| JP | 56071688 A | * | 6/1981 |
| JP | 59122703 A | * | 7/1984 |
| JP | 2004011616 A | * | 1/2004 |
| JP | 2005147086 A | * | 6/2005 |

OTHER PUBLICATIONS

JP 2005-147086 A Machine Translation. Accessed Mar. 16, 2011.*
JP 2004-11616 A Machine Translation. Accessed Mar. 16, 2011.*

* cited by examiner

*Primary Examiner* — Richard Edgar
(74) *Attorney, Agent, or Firm* — Dority & Manning, P.A.

(57) ABSTRACT

A blade segment is disclosed for a rotor blade formed from a plurality of blade segments, the blade segment having a span and a chord. The blade segment includes a shell segment having a pressure side and a suction side extending between a leading edge and a trailing edge, the shell segment further having a tip end and a root end. The blade segment further includes at least one joint portion projecting from the shell segment at one of the tip end or the root end and defining a generally span-wise extending joining surface. The joint portion allows the blade segment to be coupled to an adjacent blade segment with a mating joint portion.

20 Claims, 5 Drawing Sheets

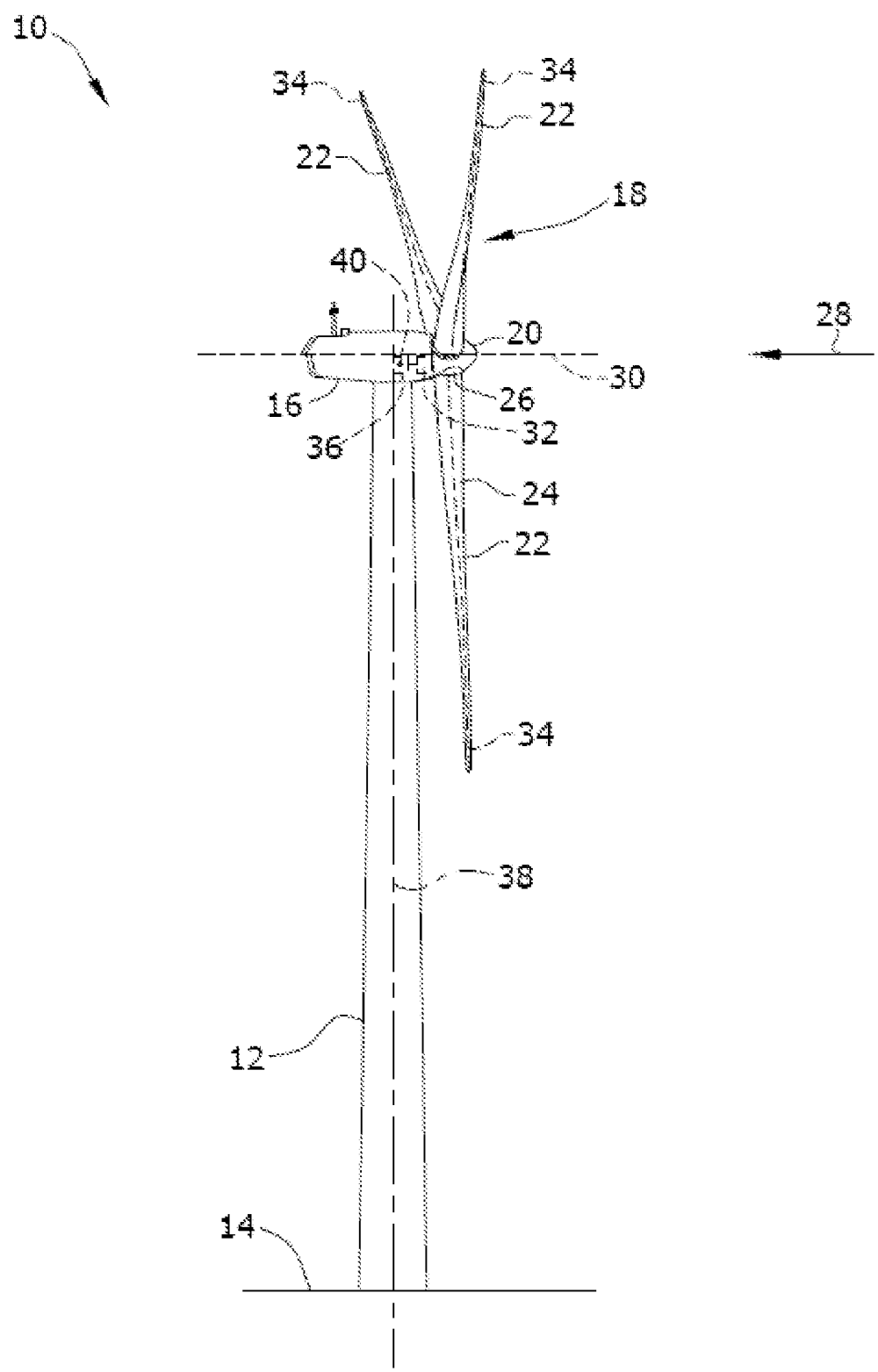
FIG. -1-

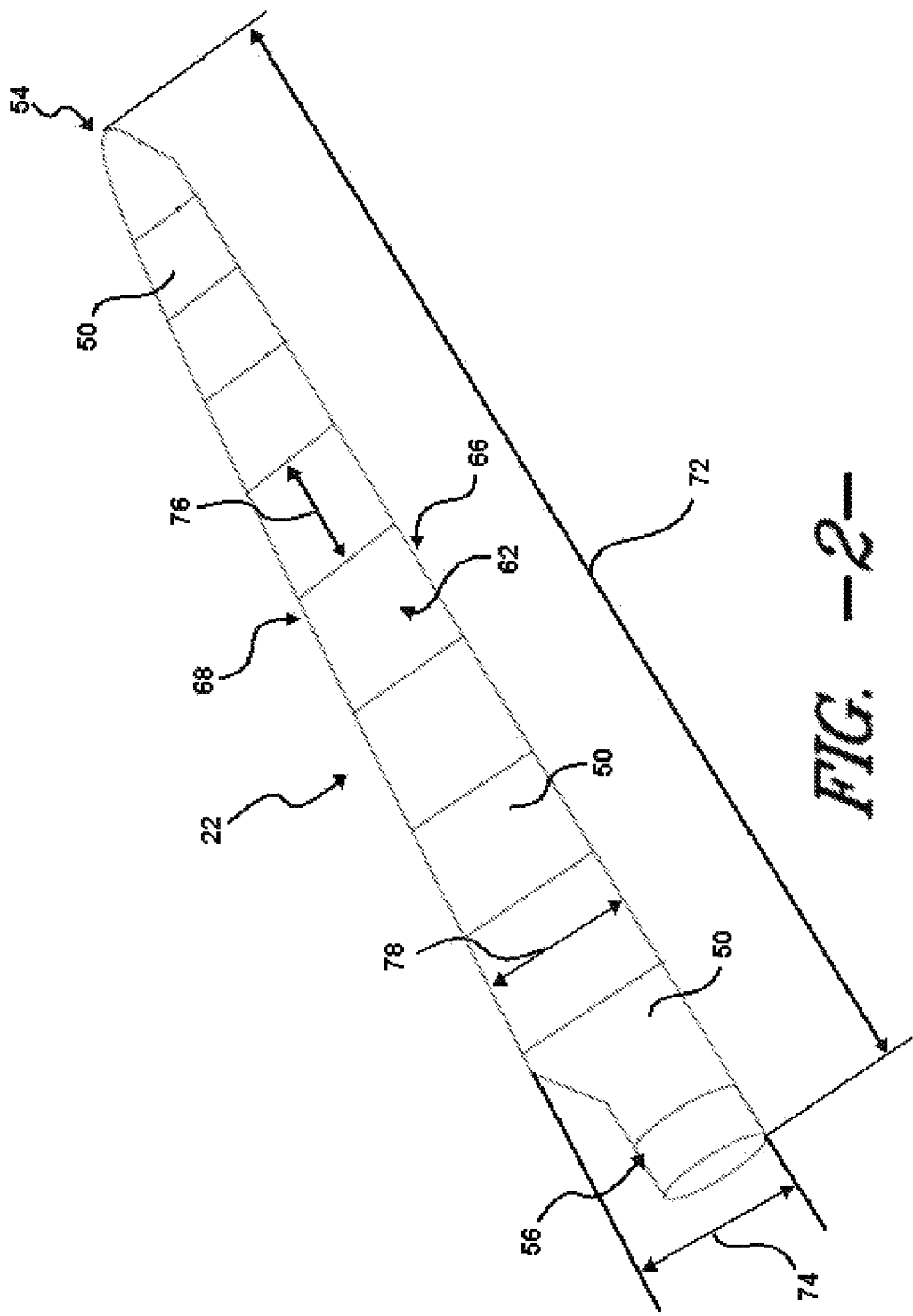
FIG. -2-

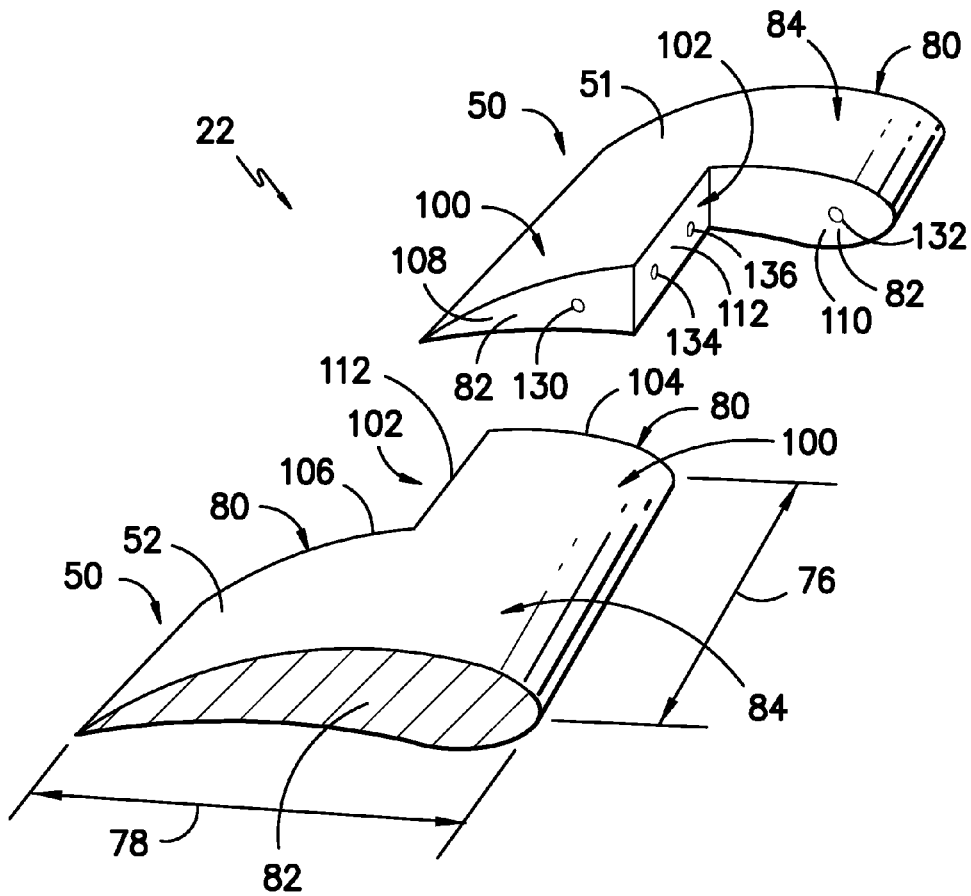
FIG. -3-
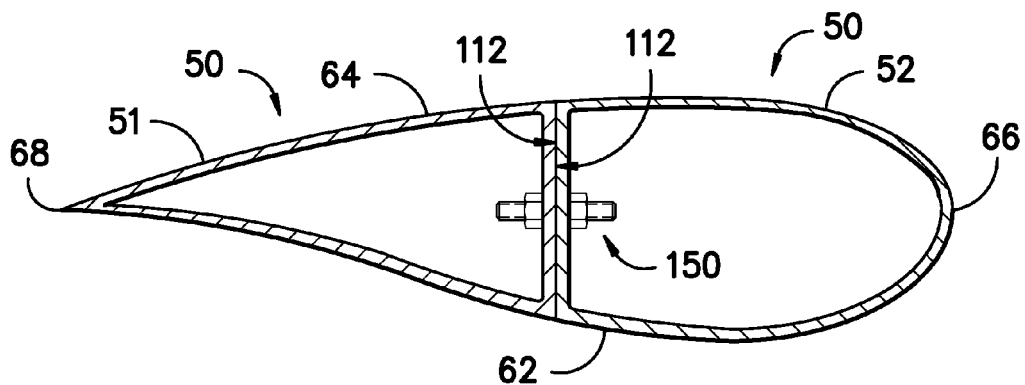
FIG. -4-

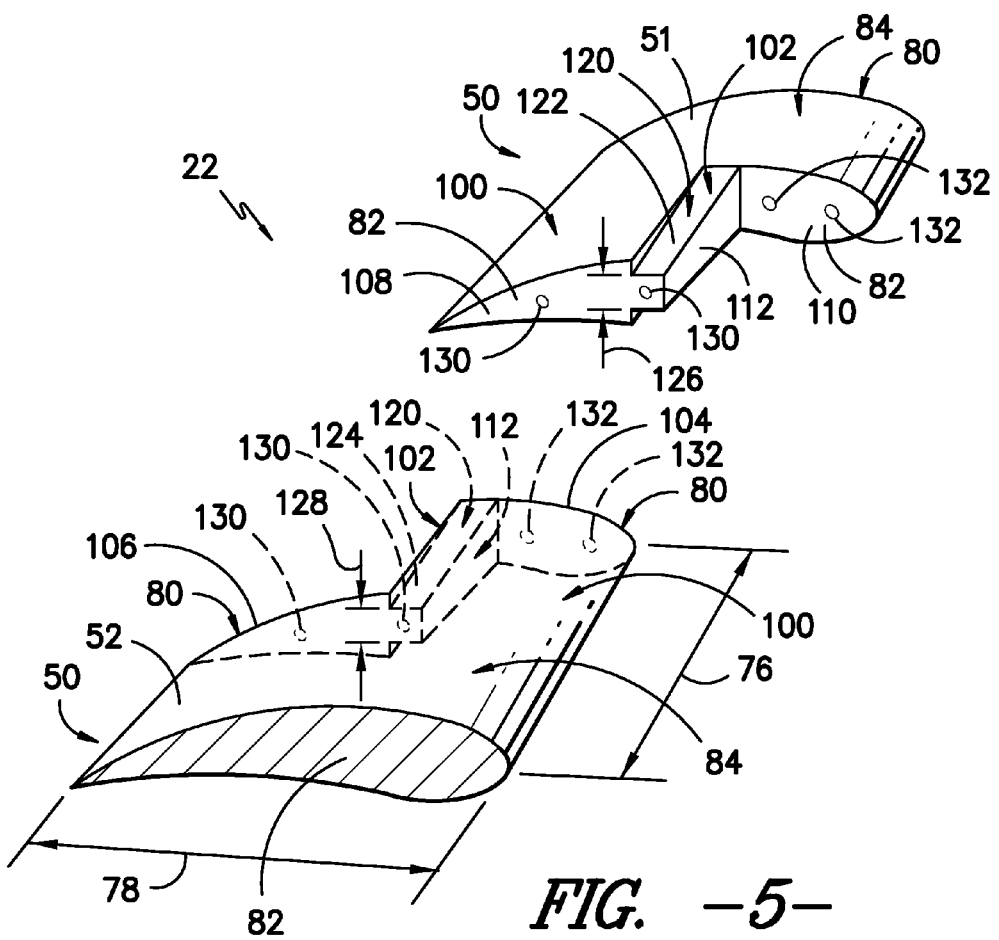
FIG. -5-
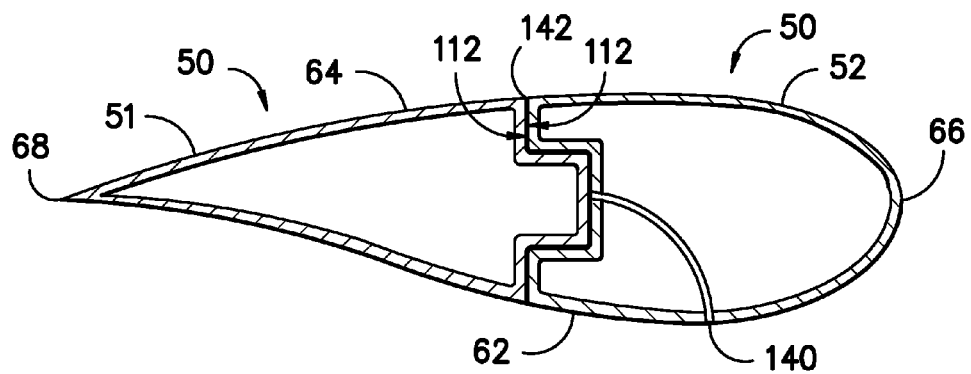
FIG. -6-

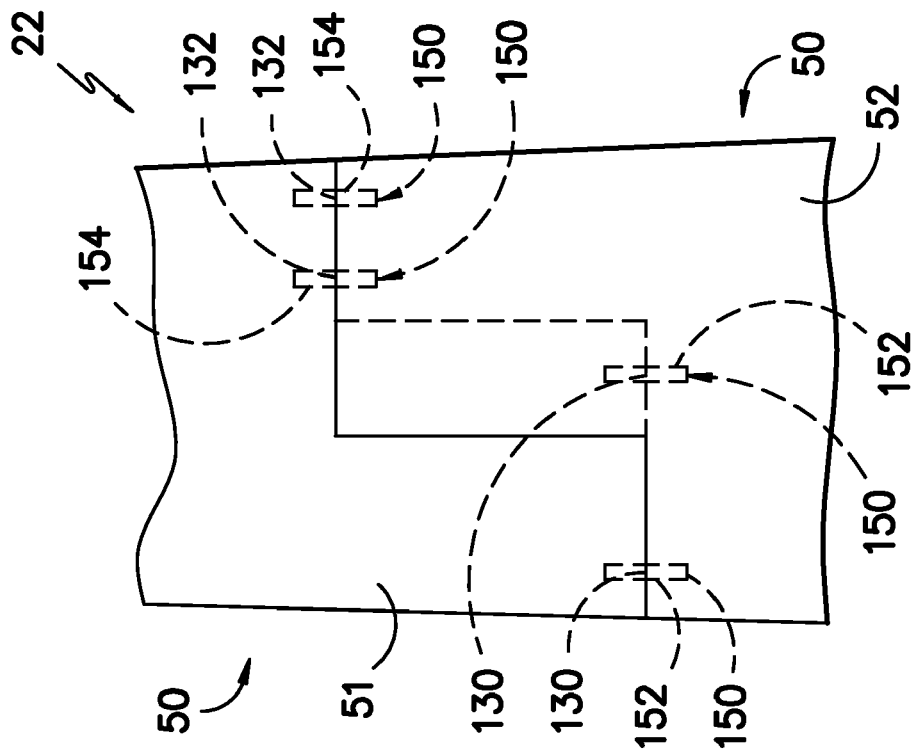
FIG. -7-
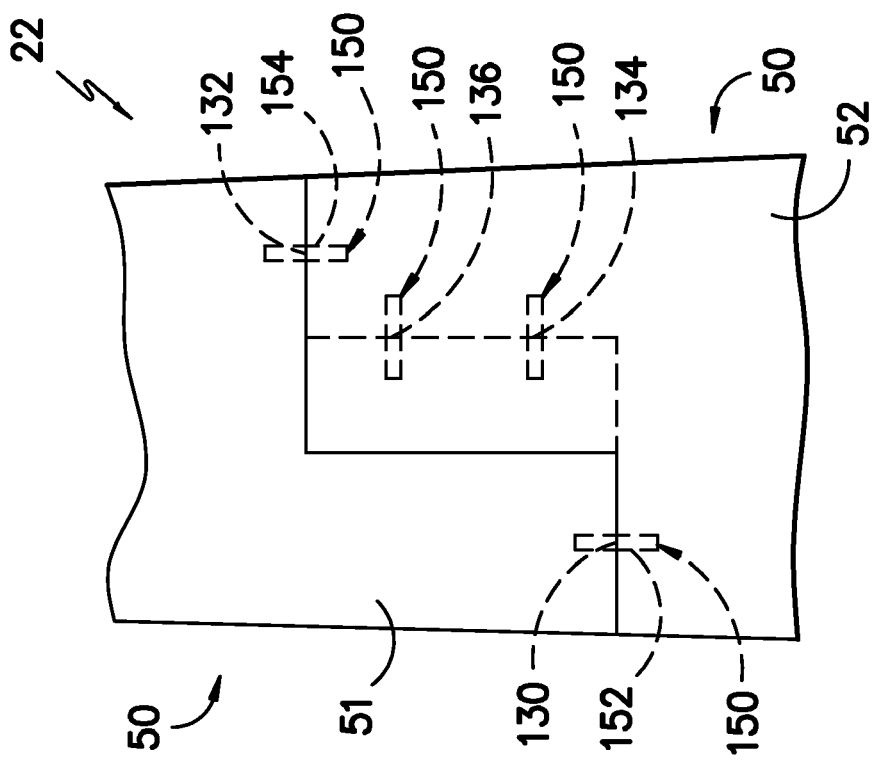
FIG. -8-

WIND TURBINE ROTOR BLADE JOINT

FIELD OF THE INVENTION

The present disclosure relates in general to wind turbine rotor blades, and more particularly to blade joints for joining blade segments in wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines in existence and in development are capable of generating from about 1.5 to about 12.5 megawatts of power. These larger wind turbines may have rotor blade assemblies larger than 90 meters in diameter. Additionally, advances in rotor blade shape encourage the manufacture of a forward swept-shaped rotor blade having a general arcuate contour from the root to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of pre-forming, transporting, and erecting a wind turbine having rotor blades in the range of 90 meters may significantly impact the economic advantage of a larger wind turbine.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. However, known devices and apparatus for connecting the blade segments together may have a variety of disadvantages. For example, many known devices cause alignment difficulties because of the relatively large span-wise movement that is required of the blade segments relative to each other during assembly, and inspection of the adjacent blade segments after assembly may be relatively difficult. Additionally, the application of, for example, a bonding material to known devices may be difficult. For example, known devices may cause difficulties in observing and inspecting the injection or infusion of bonding material between adjacent blade segments. Further, known connection devices generally do not allow for disassembly after the rotor blade has been formed, thus preventing the removal of individual blade segments for inspection, maintenance, replacement, or upgrading.

Accordingly, there is a need for a wind turbine rotor blade design that is particularly adaptable for larger wind turbines, and which minimizes the associated transportation and assembly costs of the wind turbine without sacrificing the structural rigidity and energy efficiencies of the wind turbine. More specifically, there is a need for a blade joint for wind turbine rotor blade segments that simplifies the assembly of the blade segments into a rotor blade, that allows more accurate assembly of the blade segments into a rotor blade, and that allows for disassembly of the individual blade segments as required or desired after assembly.

BRIEF DESCRIPTION OF THE INVENTION

Aspects and advantages of the invention will be set forth in part in the following description, or may be obvious from the description, or may be learned through practice of the invention.

In one embodiment, a blade segment for a rotor blade formed from a plurality of blade segments, the blade segment having a span and a chord, is disclosed. The blade segment comprises a shell segment having a pressure side and a suction side extending between a leading edge and a trailing edge, the shell segment further having a tip end and a root end. The blade segment further comprises at least one joint portion projecting from the shell segment at one of the tip end or the root end and defining a generally span-wise extending joining surface. The joint portion allows the blade segment to be coupled to an adjacent blade segment with a mating joint portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary wind turbine;

FIG. 2 is a perspective view of a segmented wind turbine rotor blade in accordance with aspects of the disclosure;

FIG. 3 is a perspective view of a portion of a rotor blade illustrating one embodiment of the joint portions of the present disclosure;

FIG. 4 is a cross-sectional view of the rotor blade of FIG. 3 illustrating two joined blade segments;

FIG. 5 is a perspective view of a portion of a rotor blade illustrating another embodiment of the joint portions of the present disclosure;

FIG. 6 is a cross-sectional view of the rotor blade of FIG. 5 illustrating two joined blade segments;

FIG. 7 is a top view of a portion of a rotor blade illustrating one embodiment of two joined blade segments; and, FIG. 8 is a top view of a portion of a rotor blade illustrating another embodiment of two joined blade segments.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18, or a larger surface area of rotor blade 22 may be presented to the wind vectors, facilitating a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring to FIG. 2, one embodiment of a rotor blade 22 in accordance with the present disclosure is shown. The rotor blade 22 may include a plurality of individual blade segments 50 aligned in an end-to-end order from a blade tip 54 to a blade root 56. Each of the individual blade segments 50 may be uniquely configured so that the plurality of blade segments 50 define a complete rotor blade 22 having a designed aerodynamic profile, length, and other desired characteristics. For example, each of the blade segments 50 may have an aerodynamic profile that corresponds to the aerodynamic profile of adjacent blade segments 50. Thus, the aerodynamic profiles of the blade segments 50 may fond a continuous aerodynamic profile of the rotor blade 22.

In general, the rotor blade 22, and thus the blade segments 50, may include a pressure side 62 and a suction side 64 (see FIGS. 4 and 6) extending between a leading edge 66 and a trailing edge 68. Additionally, the rotor blade 22 may have a span 72 and a chord 74. Further, each blade segment 50 may have a segment span 76 and a segment chord 78, as well as a tip end 80 and a root end 82.

The rotor blade 22 may, in exemplary embodiments, be curved. Curving of the rotor blade 22 may entail bending the rotor blade 22 in a generally flapwise direction and/or in a generally edgewise direction. The flapwise direction is a direction substantially perpendicular to a transverse axis through a cross-section of the widest side of the rotor blade 22. Alternatively, the flapwise direction may be construed as the direction (or the opposite direction) in which the aerodynamic lift acts on the rotor blade 22. The edgewise direction is perpendicular to the flapwise direction. Flapwise curvature of the rotor blade 22 is also known as pre-bend, while edgewise curvature is also known as sweep. Thus, a curved rotor blade 22 may be pre-bent and/or swept. Curving may enable the rotor blade 22 to better withstand flapwise and edgewise loads during operation of the wind turbine 10, and may further provide clearance for the rotor blade 22 from the tower 12 during operation of the wind turbine 10.

Referring now to FIGS. 3 through 8, each of the individual blade segments 50 of the present disclosure may include a shell segment 80. The shell segment 80 may have a generally aerodynamic profile, such as an aerodynamic profile generally corresponding to the aerodynamic profile of the rotor blade 22 and adjacent blade segments 50. Thus, the shell segment 80 may include the pressure side 62, suction side 64, leading edge 66, trailing edge 68, tip end 80, and root end 82 of the blade segment 50.

In some embodiments, the shell segment 80 may be a unitary shell. In alternative embodiments, the shell segment 80 may be formed from a plurality of shell components. These shell components may be individually formed and joined together at, for example, the leading and trailing edges 66, 68. The shell segment 80 may include an inner and outer skin and may be constructed, for example, from a dry fibrous material. In addition, the shell segment 80 may include a core material sandwiched between the inner and outer skins. This core material may be, for example, a lightweight material, such as balsa wood, extruded polystyrene foam, or the like.

Each individual blade segment 50 may further include a plurality of spar caps (not shown). The spar caps may extend at least partially through the shell segment 80 in the span-wise direction (defined as in the direction of the span 72 of the rotor blade and the span 76 of the blade segment 50) and may have a width in the chord-wise direction (defined as in the direction of the chord 74 of the rotor blade and the chord 78 of the blade segment 50). Internal shear webs (not shown) may extend through the shell segments 80 between the spar caps, such that the spar caps and internal shear webs generally form structural members, which may be, for example, I-shaped or box-shaped structural members. The spar caps and internal shear webs may generally provide structural rigidity to the individual blade segments 50. The spar caps may have shapes and curvatures that essentially correspond to the shapes and curvatures of the shell segments 80, such that the aerodynamic profiles of the spar caps correspond to the aerodynamic profiles of the shell segments 80. The spar caps may generally be formed of a carbon fiber reinforced matrix or a glass fiber reinforced polymer, or other strong, light-weight material.

Each of the blade segments 50 may include a joint portion 100, or a plurality of joint portions 100. It should be understood that the joint portions 100 of the present disclosure may be formed from any suitable material, such as, for example, any light-weight material disclosed herein. It should further be understood that the joint portion 100 of the present disclosure may be formed using any suitable forming technique. Additionally, it should be understood that the joint portions 100, or various portions thereof as discussed below, may be formed from, for example, the spar caps and/or the internal shear webs, as well as from any other suitable internal or external structure of the blade segments 50.

In general, the joint portion 100 may project from the shell segment 80 to define a generally span-wise step 102 at one of the tip end 80 or the root end 82 of the blade segment 50. Additionally, if desired, joint portions 100 may project from the shell segment 80 to define generally span-wise steps 102 at both the tip end 80 and the root end 82 of the blade segment 50. For example, in exemplary embodiments, the rotor blade 22 may comprise a first blade segment 51 and a second blade segment 52. Each blade segment 51, 52 may include a joint portion 100 projecting from the shell segment 80 of the blade segment 51, 52. The blade segment 51 or 52 including the root 56 may define a generally span-wise step 102 at the tip end 80 of the blade segment 50, while the blade segment 51 or 52 including the tip 54 may define a generally span-wise step 102 at the root end 82 of the blade segment 50. In alternative exemplary embodiments, however, the rotor blade 22 may include more blade segments 50 than the first and second blade segments 51, 52. Thus, those blade segments 50 that do not include the tip 54 or the root 56 of the rotor blade 22 may define generally span-wise steps 102 at both the tip end 80 and the root end 82 of the blade segment 50.

The steps 102 may be generally span-wise steps 102. For example, the steps 102 may separate the tip end 80 and/or the root end 82 into first and second ends. As shown in FIGS. 3 and 5, for example, the tip end 80 of one blade segment may be separated by a step 102 into a first tip end 104 and a second tip end 106, while the root end 82 may be separated by a step 102 into a first root end 108 and a second root end 110. The first tip end 104 and the second tip end 106 may be spaced from each other in the generally span-wise direction by the step 102, and the first root end 108 and the second root end 110 may be spaced from each other in the generally span-wise direction by the step 102. The ends 104, 106, 108, 110 may be considered generally chord-wise extending joining surfaces, which may operate in conjunction with the span-wise joining surface of the present disclosure, discussed below, to couple the blade segment 50 to an adjacent blade segment 50.

It should be understood that the ends 104, 106, 108, 110 need not extend precisely parallel to the chord 74 and/or chord 76 and face perpendicular to the span 72 and/or span 76. For example, the ends 104, 106, 108, 110 may be at an angle to or be rotated with respect to the axes of the spans 72, 76 and or chords 74, 78.

It should further be understood that the step 102 need not extend precisely in the direction of the span 72 and/or span 76 and perpendicular to the direction of the chord 74 and/or 76. For example, the step 102 may extend at an angle to or be rotated with respect to the axes of the spans 72, 76 and/or the chords 74, 78.

A generally span-wise extending joining surface 112 may be defined by the joint portion 100. For example, the joining surface 112 may be defined on the step 102. As discussed below, the joining surface 112 may be configured to be coupled with the mating joining surface 112 of an adjacent blade segment 50. For example, the joining surface 112 may be that generally span-wise extending surface that, when adjacent blade segments 50 are coupled together, contacts a mating joining surface 112 of an adjacent blade segment 50. The joining surface 112 may be generally planar, and/or may include portions defined on joint features, as discussed below. Thus, the joint portion 100 or joint portions 100 of each blade segment 50 may allow the blade segment 50 to be coupled to adjacent blade segments 50 with mating joint portions 100. Further, in exemplary embodiments, the joining surfaces 112 and the joint portions 100 may allow the adjacent blade segments 50 to be joined in a generally chord-wise direction, such that the blade segments 50 are brought together in the direction of the chord 74 and/or chord 78. Additionally or alternatively, however, the joining surfaces 112 and the joint portions 100 may allow the adjacent blade segments 50 to be joined in a generally span-wise direction, such that the blade segments 50 are brought together in the direction of the span 72 and/or span 76.

It should be understood that the joining surface 112 need not extend precisely in the direction of the span 72 and/or span 76 or face precisely perpendicular to the chord 74 and/or chord 78. For example, the joining surface 112 be at an angle to or be rotated with respect to the axes of the spans 72, 76 and or chords 74, 78.

The joint portion 100 of each blade segment 50 may generally partially define one of the leading edge 66 or the trailing edge 68. For example, as shown in FIGS. 3 through 8, in one embodiment, a blade segment 50, such as second blade segment 52, may include a joint portion 100 partially defining the leading edge 66. In this embodiment, the joint portion 100 may also at least partially define portions of the pressure side 62 and suction side 64 extending from the leading edge 66. In another embodiment, a blade segment 50, such as first blade segment 51, may include a joint portion 100 partially defining the trailing edge 68. In this embodiment, the joint portion 100 may also at least partially define portions of the pressure side 62 and suction side 64 extending from the trailing edge 68. In general, when a blade segment 50 includes a joint portion 100 partially defining the leading edge 66, an adjacent mating blade segment 50 may include a joint portion 100 partially defining the trailing edge 68, and vice-versa. Thus, in general, when adjacent blade segments 50 are coupled together, the mating joint portions 100 may together form the pressure side 62 and the suction side 64 extending between the leading edge 66 and the trailing edge 68 for a portion of the blade segments 50 and the rotor blade 22.

As shown in FIGS. 3 and 4, for example, adjacent blade segments 50 may be coupled together such that planer joining surfaces 112 of the blade segments 50 are generally in contact, coupling the blade segments 50 together. In further exemplary embodiments as shown in FIGS. 5 through 8, however, the blade segments 50 may include joint features 120 associated with the joint portions 100.

The joint feature 120 of a blade segment 50 may project in a generally perpendicular direction with respect to the joining surface 112, and may at least partially define the joining surface 112. For example, the perpendicular direction may, in exemplary embodiments, be the generally chord-wise direction. It should be understood, however, that the joint feature 120 need not extend precisely perpendicularly with respect to the joining surface 112. For example, the joint feature 120 may extend at an angle to perpendicular. Thus, the present disclosure is intended to encompass as joint feature 120 extending in any direction that includes a directional component that is perpendicular to the joining surface 112.

In one embodiment, the joint feature 120 may be a male joint feature 122. The male joint feature 122 may project from the joint portion 100 generally perpendicularly to the joining surface 112. Further, the joining surface 112 may at least partially be defined as the outer generally span-wise extending surface of the male joint feature 122. Alternatively, the joint feature 120 may be a female joint feature 124. The female joint feature 124 may project into the joint portion 100 generally perpendicularly to the joining surface 112, and may define a cavity therein to receive the male joint feature 122 of an adjacent blade segment 50. Further, the joining surface 112 may at least partially be defined as the inner generally span-wise extending surface of the female joint feature 122. Thus, when a blade segment 50 includes a male joint feature 122, the adjacent blade segment 54 may generally include a mating female joint feature 124.

The joint feature 120 may further have a thickness. If the joint feature 120 is a male joint feature 122, the thickness may generally be the thickness 126 of the male joint feature 122 extending between, for example, the pressure side 62 and the suction side 64, as shown in FIG. 5. If the joint feature 120 is a female joint feature 124, the thickness may generally be the thickness 128 of the cavity defined by the female joint feature 124 extending between, for example, the pressure side 62 and the suction side 64, as shown in FIG. 5. The thicknesses 126, 128 may, in some embodiments, be tapered. For example, the thicknesses 126, 128 may taper through the joint portion 100, including the entire joint portion 100 or any portion therof, in the span-wise direction.

In exemplary embodiments, the tip end 80 and/or root end 82 of a blade segment 50 may define a plurality of connection points, such as a first connection point 130 and a second connection point 132 or a plurality of first and second connection points 130, 132. The connection points may generally be defined in the tip end 80 and/or root end 82 to accommodate mechanical fasteners therethrough, such that the blade segment 50 may be connected to an adjacent blade segment 50. Further, the first and second connection points 130, 132 of adjacent blade segments 50 may be positioned such that when the adjacent blade segments 50 are coupled together, the first and second connection points 130, 132 generally mate, such that mechanical fasteners may be disposed therethrough.

The connection points, such as the first and second connection points 130, 132, defined in the tip end 80 and/or root end 82 of a blade segment 50 may allow mechanical fasteners to extend therethrough in the generally span-wise direction, as discussed below. Further, as shown in FIGS. 3, 5, 7 and 8, the first and second connection points 130, 132 may be spaced apart from each other in the generally span-wise direction. For example, one of the first and second connection points 130, 132 may be defined on the first tip end 104 or the first root end 108, while the other of the first and second connection points 130, 132 may be defined on the second tip end 106 or the second root end 110. This spacing may beneficially translate edgewise bending moments developed in the rotor blade 22 between the adjacent blade segments 50 through the development of shear forces in the mechanical fasteners disposed in the first and second connection points 130, 132.

Additionally or alternatively, the joining surface 112 of a blade segment 50 may define a plurality of connection points, such as a first connection point 134 and a second connection point 136 or a plurality of first and second connection points 134, 136. The connection points may generally be defined in the joining surface 112 to accommodate mechanical fasteners therethrough, such that the blade segment 50 may be connected to an adjacent blade segment 50. Further, the first and second connection points 134, 136 of adjacent blade segments 50 may be positioned such that when the adjacent blade segments 50 are coupled together, the first and second connection points 134, 136 generally mate, such that mechanical fasteners may be disposed therethrough.

The connection points, such as the first and second connection points 134, 136, defined in the joining surface 112 of a blade segment 50 may allow mechanical fasteners to extend therethrough in, for example, the generally chord-wise direction, as discussed below. Further, as shown in FIGS. 5 and 7, the first and second connection points 134, 136 may be spaced apart from each other in the generally span-wise direction along the joining surface 112. This spacing may beneficially translate edgewise bending moments developed in the rotor blade 22 between the adjacent blade segments 50 through the development of tension/compression forces in the mechanical fasteners disposed in the first and second connection points 130, 132.

When adjacent blade segments 50 are coupled together to form a rotor blade 22, the blade segments 50 may be secured together. In one embodiment, as shown in FIG. 6, the blade segments 50 may be bonded together. In general, the blade segments 50 may be bonded together using any suitable bonding technique, such as injection or infusion bonding, and including, for example, any bonding technique using a bonding paste or infusing resin. For example, as shown in FIG. 6, bonding material 140 may be injected between adjacent blade segments 50 through an injection tube inserted in one of the blade segments 50. The bonding material 140 may generally cover the joint portions 100 of the blade segments 50, thus bonding the joint portions 100 of the adjacent blade segments 50 together. Advantageously, the joint portions 100 of the present disclosure may allow a worker injecting the bonding material 140 between adjacent blade segments 50 to easily and efficiently visually inspect the bonding material 140 and the bonding of the adjacent blade segments 50 from exterior to the rotor blade 22. For example, the worker can simply confirm that the bonding material 140 has generally covered the joint portions 100 by confirming that bonding material 140 is seeping to the exterior of the rotor blade 22 between the joint portions 100. Thus, inspection holes and other various apparatus for inspecting the bond between adjacent blade segments are not required.

Additionally or alternatively, the blade segments 50 may be connected through the use of a mechanical fastener 150 or a plurality of mechanical fasteners 150 extending between the adjacent blade segments 50. The mechanical fasteners 150 may be, for example, nut and bolt combinations, as shown in FIGS. 4, or may be pin and bushing combinations, nails, screws, rivets, or any other suitable mechanical fasteners.

The mechanical fasteners 150 may include, for example, a first mechanical fastener 152 and a second mechanical fastener 154 or a plurality of first and second mechanical fasteners 152, 154. The first and second mechanical fasteners 152, 154 may be disposed in first and second connection points 130, 132, 134, 136, as discussed above. Further, the first and second mechanical fasteners 152, 154 may, in some embodiments, be spaced from each other in the generally span-wise direction. This spacing may beneficially translate edgewise bending moments developed in the rotor blade 22 between the adjacent blade segments 50 through the development of various forces in the mechanical fasteners disposed in the connection points 130, 132, 134, 136.

As discussed, in some embodiments a portion of the mechanical fasteners 150 may extend in a generally span-wise direction through the tip end 80 and root end 82 of adjacent blade segments 50, as shown in FIGS. 7 and 8. When various of these mechanical fasteners 150 are further spaced from each other in the generally span-wise direction, edgewise bending moments developed in the rotor blade 22 may be translated between the adjacent blade segments 50 through the development of shear forces in the mechanical fasteners 150. Further, in some embodiments, a portion of the mechanical fasteners 150 may extend in a generally chord-wise direction through the joining surfaces 112 adjacent blade segments 50, as shown in FIG. 8. When various of these mechanical fasteners 150 are further spaced from each other in the generally span-wise direction, edgewise bending moments developed in the rotor blade 22 may be translated between the adjacent blade segments 50 through the development of tension/compression forces in the mechanical fasteners 150.

Beneficially, the joint portion 100 and blade segment 50 of the present disclosure may simplify the assembly of adjacent blade segments 50 into a rotor blade 22 and allow for more accurate assembly of the blade segments 50 into the rotor blade 22. For example, the blade segments 50 of the present disclosure may require relatively less movement of adjacent blade segments 50 relative to each other in the span-wise direction for accurate assembly, thus reducing the likelihood of errors in assembly. Further, inspection of the rotor blade 22 for accurate assembly may be completed by simply reviewing the interface at the joint portions 100 of adjacent blade segments 50 to determine, for example, that the leading edges 66 and trailing edges 68 of the adjacent blade segments 50 are flush with each other. Additionally, the joint portions 100 and blade segments 50 of the present disclosure may allow for disassembly of the individual blade segments 50 as required or desired after assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blade segment for a rotor blade formed from a plurality of blade segments, the blade segment having a span and a chord, the blade segment comprising:
    a shell segment having a pressure side and a suction side extending between a leading edge and a trailing edge, the shell segment further having a tip end and a root end; and,
    at least one joint portion projecting from the shell segment at one of the tip end or the root end and defining a generally span-wise extending joining surface, the at least one joint portion further defining a first generally chord-wise extending joining surface adjacent the leading edge and a second generally chord-wise extending joining surface adjacent the trailing edge;
    wherein the joint portion allows the blade segment to be rigidly coupled in a chord-wise direction to an adjacent blade segment with a respective mating joint portion.

2. The blade segment of claim 1, the joint portion defining a generally span-wise step, the step defining the joining surface.

3. The blade segment of claim 1, further comprising a joint feature associated with the joint portion, the joint feature projecting generally perpendicularly with respect to the joining surface.

4. The blade segment of claim 3, wherein the joint feature is a male joint feature projecting from the joint portion.

5. The blade segment of claim 3, wherein the joint feature is a female joint feature projecting into the joint portion.

6. The blade segment of claim 3, wherein the joint feature has a thickness, and wherein the thickness tapers through the joint feature in the span-wise direction.

7. The blade segment of claim 1, the one of the tip end or the root end defining a first connection point and a second connection point, the first and second connection points spaced from each other in the generally span-wise direction.

8. The blade segment of claim 1, the joining surface defining a first connection point and a second connection point, the first and second connection points spaced from each other in the generally span-wise direction.

9. The blade segment of claim 1, further comprising a plurality of joint portions projecting from the shell segment, one of the plurality of joint portions projecting from the tip end and one of the plurality of joint portions projecting from the root end, each of the plurality of joint portions defining a generally span-wise extending joining surface.

10. The blade segment of claim 1, wherein the joint portion partially defines the leading edge.

11. The blade segment of claim 1, wherein the joint portion partially defines the trailing edge.

12. A rotor blade having a span and a chord, the rotor blade comprising:
    a first blade segment and a second blade segment, each of the first and second blade segments comprising:
        a shell segment having a pressure side and a suction side extending between a leading edge and a trailing edge, the shell segment further having a tip end and a root end; and,
        at least one joint portion projecting from the shell segment at one of the tip end or the root end and defining a generally span-wise extending joining surface, the at least one joint portion further defining a first generally chord-wise extending joining surface adjacent the leading edge and a second generally chord-wise extending joining surface adjacent the trailing edge, wherein the joint portions of each of the first and second blade segments allow the first and second blade segments to be rigidly coupled together in a chord-wise direction.

13. The rotor blade of claim 12, the joint portions each defining a generally span-wise step, the steps defining the joining surfaces.

14. The rotor blade of claim 12, further comprising a joint feature associated with each of the joint portions, the joint features projecting generally perpendicularly with respect to the joining surfaces.

15. The rotor blade of claim 14, wherein the joint feature of the first blade segment is a male joint feature projecting from the joint portion of the first blade segment, and wherein the joint feature of the second blade segment is a female joint feature projecting into the joint portion of the second blade segment.

16. The rotor blade of claim 12, wherein the joint portions of the first blade segment and the second blade segment are bonded together.

17. The rotor blade of claim 12, further comprising a plurality of mechanical fasteners extending between the first blade segment and the second blade segment, connecting the first blade segment and the second blade segment together.

18. The rotor blade of claim 17, wherein at least a portion of the mechanical fasteners extend in a generally span-wise direction through the one of the tip end or the root end of the first blade segment and the one of the tip end or the root end of the second blade segment.

19. The rotor blade of claim 18, wherein at least a portion of the mechanical fasteners extend in a generally chord-wise direction through the joining surfaces of the first and second blade segments.

20. The rotor blade of claim 18, wherein the plurality of mechanical fasteners include a first mechanical fastener and a second mechanical fastener, and wherein the first and second mechanical fasteners are spaced from each other in the generally span-wise direction.

* * * * *